Patented Dec. 4, 1951

2,577,699

UNITED STATES PATENT OFFICE 2,577,699

PENICILLIN ANHYDRIDES

Douglas E. Cooper, Syracuse, N. Y., assignor to Bristol Laboratories Inc., Syracuse, N. Y., a corporation of New York No Drawing. Application September 10, 1949, Serial No. 115,110

7 Claims. (Cl. 260—239.1)

This invention relates to a mixed anhydride of penicillin and to its use as a therapeutic form of penicillin, and in preparing new compounds having antibiotic activity.

The term "penicillin" is used to describe a group of mono carboxylic acids having the probable formula

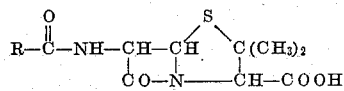

for which many R groups are known including benzyl, p-hydroxybenzyl, p-chlorobenzyl, Δ-2-pentenyl, n-heptyl and n-amyl. Penicillin is generally used in the form of a metal salt of the carboxylic acid group but may also be obtained in the form of ammonium or substituted ammonium salts. Variations in the nature of the R group are accompanied by well-known variations in the antibiotic activity of the resulting penicillins. These variations, however, are of a relatively minor order of magnitude as is illustrated by the following table:

TABLE I

|  | Approximate activity (units/mg.) against— | |
| --- | --- | --- |
|  | Staph. aureus | B. subtilis |
| Penicillin X | 600 | 1,100 |
| Penicillin G | 1,667 | 1,667 |
| Penicillin F | 1,500 | 1,000 |
| Penicillin K | 2,300 | 750 |

Various penicillin esters have been prepared and studied.

Ungar, Lancet, March 15, 1947, page 331.
Cavillito et al., Science 102, 150 (1945).
Meyer et al., Science 97, 205 (1943).
Meyer, Proc. Soc. Exptl. Biol. 53, 100 (1943).
Richardson et al., Proc. Soc. Exptl. Biol. 60, 272 (1945).
Broh-Kahn and Smith, Proc. Soc. Exptl. Biol. 61, 21–220 (1946).
Ungar, Brit. Jour. Path. 28, 88–93 (1947).

These esters include the methyl, ethyl, n-butyl, benzylhydryl, and benzyl. It has been reported, however, that these esters have little or no antibiotic activity per se, being active only when converted by hydrolysis into the carboxylate ion (i. e., penicillin). Although this hydrolysis occurs in the bodies of certain animals, such has not been found to be the case with others, and especially not with humans. The penicillin esters so far prepared and studied, consequently, are useless as therapeutic agents for man.

In none of the prior art dealing with penicillin has a derivative of the carboxyl group been reported which had not lost substantially all antibiotic activity as compared with the parent drug. Furthermore, there has existed no general method for the preparation of carboxyl derivatives of penicillin with the exception of the use of the diazomethanes to prepare the esters of penicillin listed above.

I have discovered, however, that new crystalline derivatives of penicillin can be prepared which exhibit antibiotic activity when fluid preparations of them are injected into the human or animal body. This activity results from the hydrolysis of the derivatives to the parent penicillin when in contact with aqueous body fluids, and consists substantially of the full amount of activity represented by the penicillin content of the new compound. This offers a new approach to repository therapy, since the rate at which penicillin is released into the blood stream is effectively limited by the low solubility of this type of compound in water, and desirable blood concentrations of penicillin are maintained for unusually long periods. Thus in man, intra-muscular injection of aqueous suspensions of these derivatives in amount equivalent to 300,000 units of penicillin have given bacteriostatic blood concentrations for at least four days. Since the compounds have proven to be non-toxic and non-irritating, they possess unusual merit in formulating depot-type preparations.

Also, this derivative offers a stable but reactive form of penicillin which may be used in the well-known manner of other acid anhydrides in preparing other carboxylic derivatives of penicillin, for example, amides. In addition it has other important and surprising properties as described in my copending application, U. S. Serial No. 777,113.

This compound is the diphenylacetyl anhydride of penicillin. The following examples will illustrate more fully the practice of my invention. All temperatures are in degrees centigrade.

Example 1

Diphenylacetyl chloride (0.75 g.) is dissolved in a cold solution of 1 gram sodium penicillin in 10 ml. dimethylformamide. After five minutes the solution is poured into an iced mixture of 100 ml. neutral phosphate buffer and 10 ml. chloroform, and shaken. The chloroform layer is washed with ice water, dried over sodium sulfate, and filtered. Dilution to the cloud point with isopropyl ether, followed by seeding and standing, finally cooling, gives about 0.50 g. of colorless needles, M. P. 134°, which may be separated and washed with isopropyl ether.

*Example 2*

One gram of sodium penicillin is vigorously stirred with a solution of 0.75 g. diphenylacetyl-chloride in chloroform at room temperature until all the sodium penicillin is dissolved and for ten minutes longer. An indication of when all the penicillin has gone into solution can be obtained by centrifuging samples from time to time to separate any sodium penicillin, which rises to the top, sodium chloride being thrown to the bottom. The usual over-all reaction time is 20 to 60 minutes, depending upon the agitation.

At the end of the reaction period the chloroform solution is washed with an equal volume of ice and water, separated, and then dried over sodium sulfate and filtered. Dilution with isopropyl ether as in Example 1 gives 1.0 to 1.30 grams of the crystalline anhydride, melting from 130° to 134°.

This derivative is soluble in chloroform and acetone, but only slightly soluble in isopropyl ether, aliphatic hydrocarbons, or carbon tetrachloride. It is insoluble in water. It may be recrystallized by diluting a chloroform solution at room temperature to the cloud point with isopropyl ether, seeding, then cooling at a moderate rate. In pure form it exists as stable, colorless needles, M. P. 134° (uncor.).

Anaylsis: Calculated for $C_{30}H_{28}N_2O_5S$.

|   | Calculated | Found |
|---|---|---|
| C | 68.2 | 68.2 |
| H | 5.34 | 5.58 |
| N | 5.30 | 5.34 |

*Example 3*

A solution of 15 grams 3,3-diphenylpropionyl chloride in 200 ml. chloroform was stirred at room temperature thirty minutes with 20 grams finely crystalline sodium penicillin. The suspension containing sodium chloride was washed with cold, dilute, neutral phosphate buffer, then filtered through a fine filter paper to aid separation of the layers. The lower, somewhat milky chloroform layer was drawn off, diluted with 1000 ml. isopropyl ether, seeded, and let stand in the refrigerator. The yield of colorless crystals after filtering, washing with isopropyl ether, and drying, was 19.5 grams. After recrystallization from chloroform and isopropyl ether they melted at 131°.

This compound is soluble in acetone or chloroform, slightly soluble in alcohol, but nearly insoluble in water. In buffered solutions containing appreciable amounts of water, it hydrolyzes rapidly to form salts of penicillin and diphenylpropionic acid.

Analysis: Calculated $C_{31}H_{30}N_2O_5S$.

|   | Calculated | Found |
|---|---|---|
| C | 68.6 | 68.5 |
| H | 5.57 | 5.61 |

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:
1. Diphenylacetyl penicillin anhydride.
2. Diphenylacetyl benzyl penicillin anhydride.
3. 3,3-Diphenylpropionyl penicillin anhydride.
4. 3,3-Diphenylpropionyl benzyl penicillin anhydride.
5. A compound of the general formula:

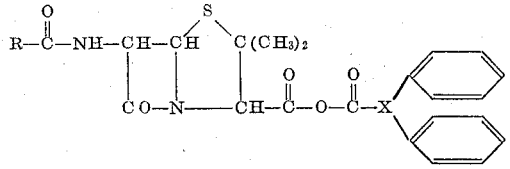

wherein R is a member of the class consisting of benzyl, p-hydroxybenzyl, p-chlorobenzyl, Δ-2-pentenyl, n-heptyl and n-amyl; and X is an alkylene chain containing 1 to 2 carbon atoms.

6. A process for the preparation of diphenylacetyl penicillin anhydride which comprises reacting diphenylacetyl chloride with sodium penicillin in a suitable solvent.

7. A process for the preparation of diphenylacetyl benzyl penicillin which comprises reacting diphenylacetyl chloride with sodium benzyl penicillin in a suitable solvent.

DOUGLAS E. COOPER.

REFERENCES CITED

The following references are of record in the file of this patent:

Cooper et al., "J. Am. Chem. Soc." vol. 70, Nov. 1948, page 3967.